United States Patent [19]

Kramer

[11] Patent Number: 4,935,478
[45] Date of Patent: Jun. 19, 1990

[54] UNSATURATED IMIDE AND BENZALDEHYDE DERIVATIVE CONTAINING HOT-CURABLE COMPOSITION OF MATTER

[75] Inventor: Andreas Kramer, Düdingen, Switzerland

[73] Assignee: Ciba-Geigy Corporation, Ardsley, N.Y.

[21] Appl. No.: 226,009

[22] Filed: Jul. 29, 1988

[30] Foreign Application Priority Data

Aug. 7, 1987 [CH] Switzerland ............... 3050/87
Oct. 27, 1987 [CH] Switzerland ............... 4204/87

[51] Int. Cl.⁵ ............................................ C08F 22/40
[52] U.S. Cl. ............................................ 526/262; 526/273; 526/316; 528/104; 528/109; 528/117; 528/119; 528/121; 528/125; 528/128; 528/226; 528/228; 528/246; 528/248; 528/265; 528/321; 528/322
[58] Field of Search .................. 526/262, 273, 316; 528/322, 321, 226, 228, 125, 128, 246, 248, 265, 104, 109, 117, 119, 121

[56] References Cited

U.S. PATENT DOCUMENTS 3,925,314 12/1975 Renner et al. ............ 528/322
4,275,185  6/1981 Lu ........................... 528/322
4,351,932  9/1982 Street et al. .............. 528/322
4,549,010 10/1985 Sparer et al. ............. 528/322

FOREIGN PATENT DOCUMENTS 1443067  7/1976 United Kingdom .
1531906 11/1978 United Kingdom .

Primary Examiner—Harold D. Anderson
Attorney, Agent, or Firm—Stephen V. O'Brien

[57] ABSTRACT

Hot-curable compositions of matter containing (a) an unsaturated imide of the formula I

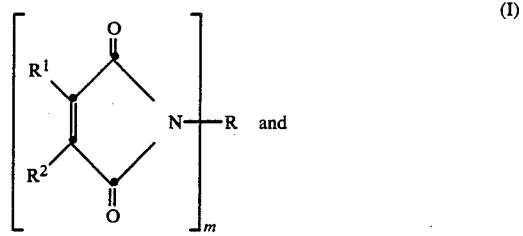

(b) a benzaldehyde derivative of the formula II

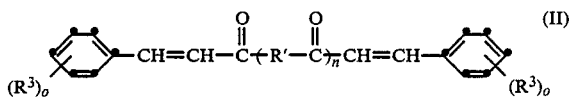

in which for example M=2, n=zero, o=1 $R^1$, $R^2$ and $R^3$ are each hydrogen and R is 4,4'diphenylmethane are suitable for the production of mouldings having excellent thermostability and resistance to thermal ageing.

11 Claims, No Drawings

UNSATURATED IMIDE AND BENZALDEHYDE DERIVATIVE CONTAINING HOT-CURABLE COMPOSITION OF MATTER

The invention relates to hot-curable compositions of matter containing certain unsaturated imides, for example bismaleimides and benzaldehyde derivatives, for example dibenzalacetone, to the use thereof for the preparation of crosslinked mouldings and to the polymers obtainable therefrom.

It is known that polymaleimides with or without the addition of crosslinking agents such as diamines or diols can be converted by heating to crosslinked products [cf., for example, U.S. Pat. Nos. 3,562,223, 3,658,764, 3,380,964 and 4,038,251]. Likewise it is known that polymaleimides can be reacted with certain unsaturated compounds to give crosslinked polymers.

Thus, for example GB No. 1,443,067 and U.S. Pat. No. 3,925,314 describe compositions of matter containing unsaturated bisimides and azomethines and possibly curing catalysts or polyamines.

U.S. Pat. No. 4,351,932 describes matrix resins containing unsaturated bisimides and divinylaromatics, for example, divinylbenzene.

GB 1,531,906 describes curable mixtures which are suitable for the preparation of foams and which contain a bismaleimide, a furfural derivative and a blowing agent. The furfural derivatives used are condensation products of furfural with mono- or diketones.

The present invention relates to hot-curable compositions of matter containing (a) an unsaturated imide of the formula I

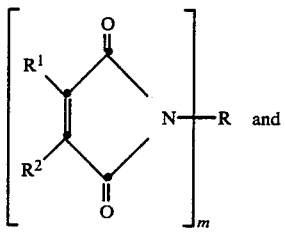

(b) a benzaldehyde derivative of the formula II

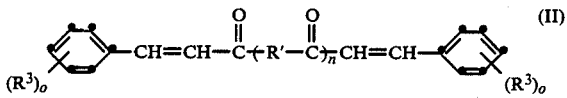

in which m is 2 or 3, n is zero or 1 and o is a whole number from 1 to 5, $R^1$ and $R^2$ independently of one another are hydrogen or methyl, R is an m-valent organic radical having 2–30 C atoms, R' is —$C_pH_{2p}$— where p =1–20, cycloalkylene having 5–10 C atoss, arylene having 6–10 C atoms or a group of the formula III

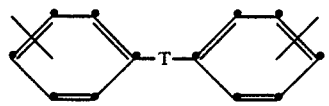

where T is a direct bond, methylene, isopropylidene, CO, O or $SO_2$ and the substituents $R^3$ independently of one another are hydrogen, alkyl having 1–12 C atoms, alkenyl having 2–6 C atoms, cycloalkyl having 5–8 C atoms, phenyl, halogen, a nitro group or is a group —$N(R^4)_2$ or —$OR^4$, the substituents $R^4$ independently of one another being hydrogen, $C_1$–$C_4$alkyl, $C_2$–$C_4$alkenyl or 2,3-epoxypropyl.

The compositions of matter according to the invention are suitable for the preparation of crosslinked products and in particular for the production of mouldings, prepregs, laminates, coatings or bonded products.

The substituents $R^1$, $R^2$ and $R^3$ of the compounds of the formulae I and II are each preferably a hydrogen atom.

Organic radicals R for which m=2 are for example: —$C_pH_{2p}$—where p=2-20, in particular —$(CH_2)_p$— where p=2–12, —$CH_2CH_2SCH_2CH_2$—, arylene having 6–10 C atoms, xylylene, cyclopentylene, cyclohexylene, 1,4-bis(methylene)cyclohexylene, the radical of bicyclohexylmethane or radicals of the formula

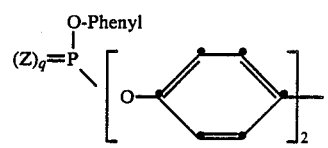

or

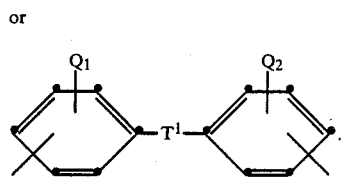

Where m is the number 3, R is for example a radical of the formula

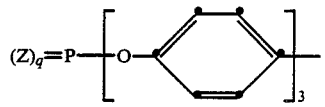

In the above formulae, $T_1$ is methylene, isopropylidene, CO, O, S, $SO_2$, —P=$O(Q_3)$, —$NQ_3$—($Q_3$=$C_1$–$C_4$alkyl), —N=N—, —CONH—, —COO—, —$NQ_3$—CO—X—CO—$NQ_3$—, —O—CO—X—CO—O—,

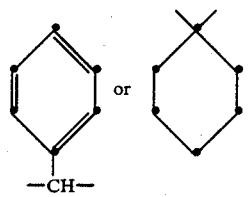

q is 0 or 1, Z is 0 or S, $Q_1$ and $Q_2$ independently of one another are a halogen atom, in particular chlorine or bromine, methyl or ethyl and in particular a hydrogen atom and X is a direct bond, —$C_tH_{2t}$—where t=1–12, arylene having 6–10 C atoms, xylylene, cyclopentylene or cyclohexylene.

Specific examples of maleimides of the formula I which can be contained in the mixtures according to the invention are:
N,N'-ethylenebismaleimide,
N,N'-hexamethylenebismaleimide, N,N'-m-phenylenebismaleimide,
N,N'-p-phenylenebismaleimide,
N,N'-4,4'-diphenylmathanebismaleimide,
N,N'-4,4'-3,3'-dichlorodiphenylmsthanebismaleimide,
N,N'-4,4'-diphenyletherbismaleimide,
N,N'-4,4'-diphenylsulphonebismaleimide,
N,N'-m-xylylenebismaleimide,
N,N'-p-xylylenebismaleimide,
N,N'-4,4'-2,2-diphenylpropanebismaleimide,
the N,N'-bismaleimide of 4,4'-diaminotriphenyl phosphate,
the N,N'-bismaleimide of 4,4'-diaminotriphenyl phosphite,
the N,N'-bismaleimide of 4,4'-diaminotriphenyl thiophosphate,
the N,N',N''-trismaleimide of tris(4-aminophenyl) phosphate,
the N,N',N''-trismaleimide of tris(4-aminophenyl) phosphite and
the N,N',N''-trismaleimide of tris(4-aminophenyl) thiophosphate.

Preferred compounds of the formula I are those in which m is the number 2 and R is $-(CH_2)_p-$ where p=2-12, m- or p-phenylene, m- or p-xylylene, 1,4-cyclohexylene, 1,4-bis(methylene)cyclohexylene, or is the radical of 4,4'-bicyclohexylmethane and in particular a radical of the formula IV

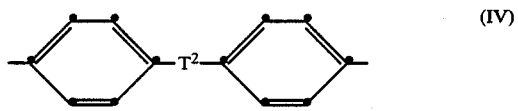
(IV)

in which $T^2$ is O, $CH_2$ or $SO_2$. Very particular preference is given to N,N'-4,4'-diphenylmethanebismaleimide.

The substituents $R^3$ of the compound of the formula II independently of one another can be a straight-chain or branched alkyl group having 1–12 C atoms such as methyl, ethyl, isopropyl, n-butyl, isopentyl, n-hexyl, 2-ethylhexyl, n-decyl and n-dodecyl, preferably an alkyl having 1–8 C atoms. An alkenyl group $R^3$ having 2–6 C atoms can also be straight-chain or branched such as vinyl, allyl, methallyl, 2-butenyl and 3-hexenyl, preferably allyl.

A cycloalkyl group $R^3$ can be a cyclopentyl, cyclohexyl, cycloheptyl or cyclooctyl group, preferably cyclohexyl.

A halogen atom $R^3$ can be fluorine, iodine and preferably chlorine or bromine.

Where $R^3$ is a group $-N(R^4)_2$ or $-OR^4$, the $R^4$ radicals are for example methyl, ethyl, n-propyl, iso-propyl, n-butyl, iso-butyl, sec-butyl, tert-butyl, vinyl, 1- or 2-propenyl or 1-, 2- or 3-butenyl.

A $-C_pH_{2p}-$group R' can be a straight-chain or branched radical such as methylene, ethylene, propylene, trimethylene, tetramethylene, hexamethylene octamethylene and dodecamethylene. Preferably, R' is a $-(CH_2)_p-$ group where m=1 to 12. R' as a group of the formula III is preferably bound in the 4,4'-position.

An arylene group R' having 6–10 C ators can be, for example, a m-phenylene, p-phenylene, 1,3-naphthylene, 1,4-naphthylene, 1,5-naphthylene or 2,6-naphthylene group.

Where R' is a group of the formula III, T is preferably the methylene group, O or $SO_2$.

A cycloalkylene R' having 5–10 C atoms can be mono- or even bicyclic, for example, pentylene, hexylene, heptylene, octylene, decalinylene, bicyclohexylene, bicycloheptylene, bicyclooctylene and the like.

Preference is given to compounds of the formula II in which o is the number 1 and $R^3$ is hydrogen, alkyl having 1–4 C atoms, alkenyl having 2–4 C atoss, $-NHR^4$ or $-OR^4$ and also to those compounds in which R' is $-(CH_2)_p-$ where p=1–12, cyclopentylene, cyclohexylene, o-, m- or p-phenylene or napthylene. Particular preference is given to compounds of the formula II in which R' is $-CH_2-$ or p-phenylene. Very particularly preferred compounds of the formula II are 4,4'-diallyloxydibenzalacetone, 4,4'-dimethoxydibenzalacetone and in particular dibenzalacetone.

Preferably, the ratio of amounts of components (a) and (b) of the compositions of matter according to the invention is selected in such a manner that 0.5–10, in particular 1–5, mol of the unsaturated imide (a) are used per mole of the benzaldehyde derivative (b).

The compositions of matter according to the invention can, in addition to components (a) and (b), also contain (c) 1 to 50% by weight, preferably 5 to 40% by weight, particularly preferably 10 to 30% by weight, based on the sum of (a) and (b), of at least one compound which is capable of reacting with component (a). Any desired known compounds can be used for this purpose. Compounds which are capable of reacting with unsaturated imides are described, for example, in U.S. Pat. No. 4,666,997 as component (c) of the compositions of matter. Polyamines or polyols are particularly suitable for this purpose. The polyamines or polyols can be, for example, phenol or cresol novolaks or compounds of the formula

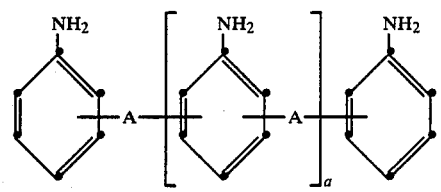

where a equals a number from 0.1 to 2 and A is a divalent hydrocarbon radical of an aldehyde or a ketone having 1–8 C atoms obtained after removal of the oxygen atom.

Preferred components (c) of the compositions of matter according to the invention are diamines or diols of the formula V $$HQ-R''-QH \qquad (V),$$

in which Q is equal to O or NH and R'' is a divalent organic radical having 2–30 C atoms. Preferred radicals R'' are, for example, the groups described as preferred radicals R.

Particularly suitable diamines are aromatic diamines, for example, phenylenediamine, naphthylenediamine, diaminobiphenyl or compounds of the formulae Va or Vb

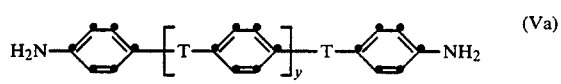
(Va)

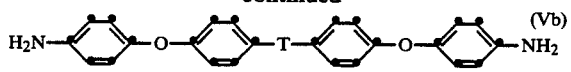

in which y is zero to 5 and T is as defined above. Of the compounds of the formula Va, particular preference is given to 1,4-bis(4'-aminophenoxy)benzene and, of the compounds of the formula Vb, to those in which T is isopropylidene.

Preferred compounds (c) of the compositions of matter according to the invention are also compounds of the formula VI

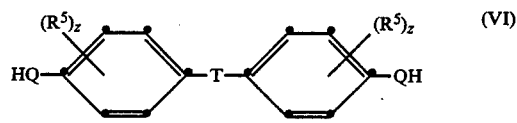

in which Q and T are as defined above, z is zero or a whole number from 1 to 4, in particular zero or 1, and $R^5$ is a $C_1$–$C_4$alkyl radical, a $C_2$–$C_4$alkenyl radical or a halogen atom.

The alkyl and alkenyl radicals which have been mentioned as examples of $R^4$ can also be the corresponding radicals $R^5$. A halogen atom $R^5$ is preferably chorine or in particular bromine and the symbol z in formula VI is in this case preferably 2 or 4.

Particularly preferred compounds (c) are compounds of the formula VIa

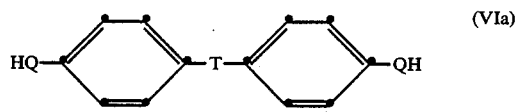

and of the diphenols particularly preference is given to compounds of the formula VII

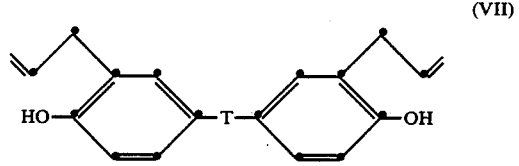

in which Q and T in the formulae VIa and VII are as defined above. Examples of compounds of the formula VII are: bis(4-hydroxy-3-allyl)biphenyl, bis(4-hydroxy-3-allylphenyl)methane and 2,2-bis(4-hydroxy-3-allylphenyl)propane.

The most preferred compounds (c) are 4,4'-diaminodiphenylmethane and 2,2-bis(4-hydroxy-3-allylphenyl)propane (o,o'-diallylbisphenol A).

Components (a), (b) and possibly (c) of the compositions of matter according to the invention can each be individual compounds or mixtures of two or more compounds defined above. Particularly suitable compositions of matter are those which contain a mixture of an aromatic (that is, R in formula I is an aromatic radical) bismaleimide and of an aliphatic or cycloaliphatic bismaleimide as component (a), the proportion of the aromatic bismaleimide being preferably 75–95% by weight and the proportion of the aliphatic or cycloaliphatic bismaleimide being preferably 25–5% by weight, based on the total amount of component (a).

Components (a), (b) and (c) defined above of the compositions of matter according to the invention are known and can be prepared by known methods.

The benzaldehyde derivatives of the formula II can be prepared, for example, by reaction of a substituted or unsubstituted benzaldehyde of the formula VIII

with acetone or with a diketone of the formula IX

which contains acetyl groups and in which o, $R^3$ and R' are as defined above. Suitable compounds of the formula IX are, for example, acetylacetone or in particular 4-acetyl-benzophenone. The preparation of dibenzalacetone is described, for example, in Org. Synthesis Coll. Vol. II, 167. The other compounds of the formula II defined above can be prepared analogously.

The compositions of matter according to the invention are suitable for the preparation of polymers which have excellent physical properties. In addition, the compositions of matter are distinguished by low viscosity and a long pot life and are therefore readily processable.

The invention further relates to polymers which can be obtained by heating a composition of matter according to the invention at a temperature between 100° and 300° C. for 1 to 20 hours.

The curing or processing of the compositions of matter can be carried out in an inert organic solvent, but preferably from the melt and in the presence or absence of a curing catalyst. Examples of suitable inert organic solvents are dimethylformamide, dimethylacetamide, N-methylpyrrolidone, toluene, xylenes, methylene chloride, tetrahydrofuran, methyl ethyl ketone, and ethylene glycol monoalkyl or dialkyl ether having 1–4 C atoms in the alkyl groups. Depending on the intended use, curing catalysts can be, for example, organic peroxides such as di-tert-butyl peroxide, dicumyl peroxide, tert-butyl perbenzoate, or basic catalysts, in particular primary, secondary and tertiary amines such as diethylamine, tributylamine, triethylamine, benzylamine, N,N,',-tetrasmethyl-4,4'-diaminodiphenylmethane, N,N-diisobutylaminoacetonitrile, N,N-dibutylaminoacetonitrile and heterocyclic bases such as quinoline, N-methylpyrrolidine and imidazole. Especially in the case where phenols or polyols are used as additional component which is capable of reacting with the maleimide groups and is present in the compositions of matter according to the invention, the addition of basic catalysts of the type mentioned is recommended. In general, the curing is carried out at temperatures between 100° and 300° C., in particular 120° and 250° C.

The compositions of matter according to the invention are low-melting solid resins to viscous liquid resins and are distinguished by a high reactivity and good mechanical and thermal properties of the products cured therewith, such as, in particular, a good thermostability and resistance to thermal ageing. The products thus obtained have high glass transition temperatures and a very high thermal stability and, in addition exhibit little brittleness. The compositions of matter according to the invention can further be easily applied from the melt, in particular even without the addition of non-volatile solvents, for example for impregnating fabrics of glass fibre, carbon fibre or aramid fibre such as fibre fabrics made from poly(1,4-phenyleneterephthalamides) known under the trade name Kevlar ®.

The compositions of matter according to the invention can be used for many purposes, for example as laminating or electrical insulating resins, as high-temperature adhesives or for the production of coatings or mouldings. They are very particularly suitable for the production of prepregs and heat-resistant composite materials and also as laminating resins, resins for the filament-winding process or as high-temperature adhesives.

The invention also relates to the use of the compositions of matter according to the invention for the production of mouldings, prepregs, laminates, coatings or bonded products.

The invention is illustrated in more detail by the examples which follow.

EXAMPLE 1

117.2 g of dibenzalacetone prepared according to Org. Synth. Coll. Vol. II, 167 (0.5 mol) are heated to 140° C. and 179.2 g of N,'-4,4'-diphenylmethanebismaleimide (0.5 mol) are then added with stirring. After about 10–15 minutes, the bismaleimide has completely melted and the mixture is clear. By differential thermoanalysis (System TA 2000 from Mettler AG, Greifensee, Switzerland), the mixture shows a reaction start $T_A$ at 140° C. and a reaction maximum $T_{max}$ at 204° C. The integral heat of the reaction $\Delta H$ of the curing is 275 kJ/kg. The mixture is degassed at about 120° C. for 20 minutes and then poured into moulds of $120 \times 120 \times 4$ mm$^3$. In an oven, the test samples are cured at 150° C. for 4 hours, at 200° C. for 2 hours and at 250° C. for 6 hours. After cooling, the sheet is cut into test rods the following properties of which are measured:

| | |
|---|---|
| Flexural strength according to ISO 178: | 49.8 N/mm$^2$ |
| Extreme fibre elongation according to ISO 178: | 1.5% |
| Glass transition temperature[1]: | >300° C. |
| 10% of weight loss at[2]: | 395° C. |
| Tensile shear strength according to ISO 4587: | 6.7 N/mm$^2$ |

[1]measured by TMA, Du Pont 9900 thermal analyser
[2]measurement performed by heating a sample in TA 3000 (differential thermoanalysis system from Mettler); determination of the temperature at which 10% of the sample have evaporated; heating rate: 10° C./min (in air).

EXAMPLES 2–4

Further mixtures of dibenzelactone and N,N'-4,4'-diphenylmethanebismaleimide are prepared by the process described in Example 1 and processed to mouldings. The properties of the mixtures and the cured products are determined as mentioned in Example 1. The results are summarized in Table 1:

TABLE 1

| Example No. | 2 | 3 | 4 |
|---|---|---|---|
| Dibenzalacetone | 87.9 g | 58.6 g | 29.3 g |
| N,N',4,4'-diphenylmethane-bismaleimide | 179.2 g | 179.2 g | 179.2 g |
| $T_A$ (°C.) | 150 | 155 | 160 |
| $T_{max}$ (°C.) | 199 | 201 | 199 |
| $\Delta H$ (kJ/kg) | 240 | 220 | 170 |

TABLE 1-continued

| Example No. | 2 | 3 | 4 |
|---|---|---|---|
| Flexural strength (N/mm$^2$) | 47 | 50 | 40 |
| Extreme fibre elongation (%) | 1.4 | 1.5 | 1.1 |
| Glass transition temperature (°C.) | >300 | >300 | >300 |
| 10% of weight loss at (°C.) | 415 | 430 | 465 |
| Tensile shear strength (N/mm$^2$) | 7.4 | 6.8 | 6.8 |

EXAMPLE 5

A mixture of 88.2 of 4,4'-dimethoxybenzalacetone (0.3 mol) prepared according to Berichte der Deutschen Chemischen Gesellschaft 35, 1192 and 107.4 g of N,N',4,4'-diphenylmethanebisimaleimide (0.3 mol) is prepared by the process described in Example 1, cast into sheets and cured at 120° C. for 2 hours, at 150° C. for 2 hours, at 200° C. for 1 hour and at 250° C. for 6 hours. The following properties are measured:

| | |
|---|---|
| Flexural strength | 71 N/mm$^2$ |
| Extreme fibre elongation | 1.9% |
| Glass transition temperature | >300° C. |
| 10% of weight loss at | 380° C. |

EXAMPLE 6

A mixture of 103.8 g of 4,4'-diallyloxydibenzalacetone (0.3 mol) prepared according to Org. Synth. Coll. Vol. II, 167 from p-allyloxybenzaldehyde and acetone and 107.4 g of N,N',4,4'-diphenylmethanebismaleimide (0.3 mol) is prepared by the process described in Example 1, cast into sheets and cured at 120° C. for 2 hours, at 150° C. for 2 hours, at 200° C. for 1 hour and at 250° C. for 6 hours. The following properties are measured:

| | |
|---|---|
| Flexural strength | 41 N/mm$^2$ |
| Extreme fibre elongation | 1.3% |
| Glass transition temperature | >300° C. |
| 10% of weight loss at | 425° C. |

EXAMPLE 7

23.4 g of dibenzalacetone (0.1 mol) are heated to 140° C. and 143.2 g of N,N',4,4'-diphenylmethanebismaleimide (0.4 mol) are then added with stirring. After about 20 minutes, the bismaleimide has completely melted. 39.6 g (0.2 mol) of 4,4'-diaminodiphenylmethane are then dissolved in this melt at 120° C. The clear mixture is then degassed at 120° C., then cast in moulds of $120 \times 120 \times 4$ mm3 and cured in a furnace at 120° C. for 2 hours, at 150° C. for 2 hours, at 200° C. for 1 hour and at 250° C. for 6 hours. The following properties are measured as mentioned in Example 1:

| | |
|---|---|
| Flexural strength | 150 N/mm$^2$ |
| Extreme fibre elongation | 6.2% |
| Impact strength according to ISO 179 | 16.2 kJ/m$^2$ |
| Glass transition temperature | 297° C. |
| Tensile shear strength | 12.2 N/mm$^2$ |
| 10% of weight loss at | 405° C. |

EXAMPLES 8-10

A mixture of N,N',4,4'-diphenylmethanebismaleimide, dibenzalacetone and o,o'-diallylbisphenol A is melted at 150° C. The clear melt is degassed at 150° C. for 10 minutes, then poured into a mould of 120×120×4 mm³ and cured at 160° C. for 2 hours, at 180° C. for 1 hour, at 200° C. for 1 hour and at 250° C. for 6 hours. After cooling, the sheet is cut into test rods. The results are summarized in Table 2:

TABLE 2

| Example No. | 8 | 9 | 10 |
|---|---|---|---|
| N,N',4,4'-diphenylmethanebis-maleimide | 89.6 g | 89.6 g | 89.6 g |
| Dibenzalacetone | 11.7 g | 23.4 g | 35.1 g |
| o,o'-diallylbisphenol A | 38.6 g | 38.6 g | 38.6 g |
| Viscosity at 120° C. | 120 | 80 | 70 |
| (m Pa.s) at 80° C. | — | 2,900 | 1,700 |
| Gel time at 160° C. (min) | 120 | 120 | 120 |
| Glass transition temperature (°C.) | 314 | 307 | 299 |
| Flexural strength (N/mm²) | 153 | 149 | 135 |
| Extreme fibre elongation (%) | 5.6 | 5.5 | 4.6 |
| Impact strength (kJ/m²) | 23.0 | 21.4 | 19.8 |
| 10% of weight loss at (°C.) | 410 | 395 | 385 |

What is claimed is:

1. A heat-curable composition of matter containing (a) an unsaturated imide of the formula I

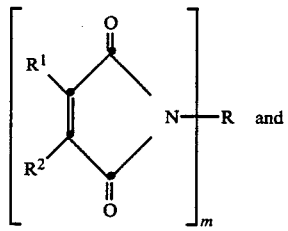

(b) a benzaldehyde derivative of the formula II

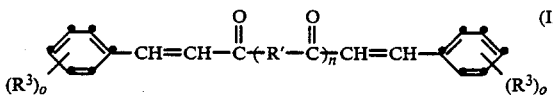

in which m is 2 or 3, n is zero or 1 and o is a whole number from 1 to 5, $R^1$ and $R^2$ independently of one another are hydrogen or methyl, R is an m-valent organic radical having 2-30 C atoms, R' is —$C_pH_{2p}$— where p=1-20, cycloalkylene having 5-10 C atoms, arylene having 6-10 C atoms or a group of the formula III

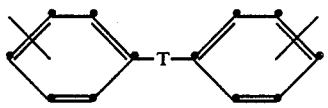

where T represents a direct bond, or is methylene, isopropylidene, CO, O or $SO_2$ and the substituents $R^3$ independently of one another are hydrogen, alkyl having 1-12 C atoms, alkenyl having 2-6 C atoms, cycloalkyl having 5-8 C atoms, phenyl, halogen, a nitro group or is a group —$N(R^4)_2$ or —$OR^4$, the substituents $R^4$ independently of one another being hydrogen, $C_1$-$C_4$alkyl, $C_2$-$C_4$alkenyl or 2,3-epoxypropyl.

2. A composition of matter according to claim 1, in which $R^1$, $R^2$ and $R^3$ are hydrogen atoms.

3. A composition of matter according to claim 1, in which m is the number and R is —$(CH_2)_p$— where p=2-12, m- or p-phenylene, m- or p-xylylene, 1,4-cyclohexylene, 1,4-bis(methylene)cyclohexylene, or is the radical of 4,4'-bicyclohexylmethane or a radical of the formula IV in which $T^2$ is 0,

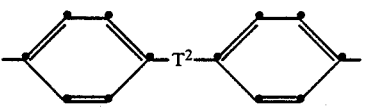

$CH_2$ or $SO_2$.

4. A composition of matter according to claim 1, wherein (a) is N,N',4,4'-diphenylmethanebismaleimide.

5. A composition of matter according to claim 1, in which o is the number 1 and $R^3$ is hydrogen, alkyl having 1-4 C atoms, alkenyl having 2-4 C atoms, —$NHR^4$ or —$OR^4$.

6. A composition of matter according to claim 1, in which R' is —$(CH_2)_p$— where p=1-12, cyclopentylene, cyclohexylene, o-, m- or p-phenylene or naphthylene.

7. A composition of matter according to claim 1, in which R' is —$CH_2$—or p-phenylene.

8. A composition of matter according to claim 1, in which compound (b) is 4,4'-diallyloxydibenzalacetone, 4,4'-dimethoxydibenzalacetone or dibenzalacetone.

9. A composition of matter according to claim 1, containing 0.5-10 mol of component (a) per mole of component (b).

10. A polymer obtainable by heating a composition of matter according to claim 1 to a temperature between 100 and 300° C. for 1-20 hours.

11. A molding, prepreg, laminate, coating or bonded product of the composition of matter according claim 1.

* * * * *